(12) United States Patent
Takahashi et al.

(10) Patent No.: US 6,628,361 B2
(45) Date of Patent: Sep. 30, 2003

(54) LIQUID CRYSTAL DISPLAY DEVICE AND WIRING STRUCTURE THEREFOR

(75) Inventors: Takuya Takahashi, Hitachi (JP); Yoichi Sakaki, Hitachinaka (JP); Isao Ikuta, Iwaki (JP); Katsumi Tamura, Hitachi (JP); Ken-ichi Onisawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 27 days.

(21) Appl. No.: 09/790,638

(22) Filed: Feb. 23, 2001

(65) Prior Publication Data

US 2001/0022635 A1 Sep. 20, 2001

(30) Foreign Application Priority Data

Feb. 25, 2000 (JP) .................................... 2000-050040

(51) Int. Cl.[7] .............................................. G02F 1/1343
(52) U.S. Cl. ........................ 349/139; 349/143; 349/147
(58) Field of Search ................................ 349/139, 143, 349/147

(56) References Cited

U.S. PATENT DOCUMENTS 5,162,933 A * 11/1992 Kakuda et al. ............... 349/46
6,008,877 A * 12/1999 Akiyama et al. ............ 349/147
6,023,318 A * 2/2000 Tomono et al. ............. 349/146
6,208,400 B1 * 3/2001 Kameyama et al. ........ 349/147

* cited by examiner

Primary Examiner—Kenneth Parker
Assistant Examiner—David Chung
(74) Attorney, Agent, or Firm—Antonelli, Terry, Stout & Kraus, LLP

(57) ABSTRACT

A wiring structure is provided, the wiring structure being formed by forming a laminated film of silver (Ag) or an alloy containing silver (Ag) as the major constituent and the other metallic material, and by forming a wiring pattern through a single process of photolithography.

The wiring structure comprises a plurality of first parallel wires; a plurality of second parallel wires intersecting with the first parallel wires; and a plurality of active elements, each of the active elements being arranged at a position near an intersection of the first parallel wire and the second parallel wire and connected to the first parallel wire and the second parallel wire, wherein part or all of the first parallel wires and the second parallel wires are of a laminated structure of a layer made of silver (Ag) or an alloy containing silver (Ag) as a major constituent and a layer made of a metallic element having standard electrode potential of dissolution reaction lower than the standard electrode potential of silver (Ag) or an alloy containing said metallic element as a major constituent, and are formed through a single process of photolithography.

4 Claims, 3 Drawing Sheets

| COMPOSITION OF Mo ALLOY | RESULT OF EVALUATING CONTACT |
| --- | --- |
| Mo-0.2wt%Cr | × |
| Mo-0.5wt%Cr | ○ |
| Mo-1.5wt%Cr | ○ |
| Mo-3.3wt%Cr | ○ |
| Mo-2.0wt%Hf | × |
| Mo-5.0wt%Hf | ○ |
| Mo-14wt%Hf | ○ |
| Mo-30wt%Hf | ○ |
| Mo-1.0wt%Zr | × |
| Mo-2.5wt%Zr | ○ |
| Mo-8.0wt%Zr | ○ |
| Mo-20wt%Zr | ○ |

LIQUID CRYSTAL DISPLAY DEVICE AND WIRING STRUCTURE THEREFOR

BACKGROUND OF THE INVENTION

The present invention relates to a liquid crystal display unit and a wiring structure of the liquid crystal display device, and particularly to an active matrix type liquid crystal display device (AM-LCD) which is driven by many thin-film transistors (TFT) and a wiring structure of the active matrix type liquid crystal display device.

In recent years, a thin-film transistor driving liquid crystal display device (TFT-LCD) is used as a liquid crystal display device which can be made thin in size, light in weight and high in definition, and the market of the thin-film transistor driving liquid crystal display device is gradually being expanded compared to that of the conventional display device using a cathode-ray tube.

The thin-film transistor driving liquid crystal display device is constructed by forming a plurality of parallel gate wires, a plurality of parallel data wires intersecting with the plurality of gate wires, a plurality of thin-film transistors each arranged near each of the intersections of the parallel gate wire and the parallel data wire, pixel electrodes each connected to each of the thin-film transistors, gate insulator films each covering a gate of each of the thin-film transistors and a protective film covering exposed portions of each of the thin-film transistor on a first substrate (a glass substrate); and by placing a second substrate (a glass substrate) opposite to the first substrate; and by putting a liquid crystal layer between the first substrate and the second substrate arranged opposite to each other. In regard to such a thin-film transistor drive liquid display device, as needs of large display screen and high definition are growing more in recent years, the requirements of specifications to the thin-film transistor drive liquid display device such as necessity of reducing resistance of the parallel gate wiring and the parallel data wiring, necessity of increasing the manufacturing yield at manufacturing the display devices and so on become severer.

In order to reduce the resistance of the parallel gate wiring and the parallel data wiring, it is necessary to employ a material having a low resistivity as the wiring material. As such a material, aluminum (Al), copper (Cu), silver (Ag) or an alloy containing any one of the above elements as a major constituent is known. However, as reported, for example, in Journal of the Electrochemical Society, 137 (1990), pp. 3928–3930, it is well known that these low-resistance wiring materials are large in contact resistance with indium-tin oxide (ITO) which is generally used for connecting terminals of the parallel gate wiring and the parallel data wiring, and accordingly, it is impractical to directly connect the low-resistance wire to the indium-tin oxide terminal. Therefore, a clad structure, in which the parallel gate wiring and the parallel data wiring made of the low-resistive wiring material are coated with the other metallic material, is formed so that the other material may bear the contact property with the indium-tin oxide and the low-resistive wiring material may bear the low resistive property of the parallel gate wiring and the parallel data wiring. Such a clad structure is disclosed, for example, in Japanese Patent application Laid-Open No.9-26602.

In general photolithography is used to form such a clad structure, and it is necessary to perform the two processes of photolithography in total, that is, one process for the low-resistive wiring material and the other process for the other metallic material, which makes the manufacturing process complicated. Therefore, in order to simplify the manufacturing process, a wiring pattern of the laminated structure is formed by a method of continuously forming a laminated layer of a film made of aluminum or aluminum alloy and a film made of the other metallic material through a single process of photolithography. The laminated structures formed through methods similar to the above are disclosed, for example, in Japanese Patent Application Laid-Open No.11-74537, Japanese Patent Application Laid-Open No.6-281954, Japanese Patent Application Laid-Open No.4-240824, Japanese Patent Application Laid-Open No.4-20930 and Japanese Patent Application Laid-Open No.10-240150.

The thin-film transistor drive liquid display device needs to use wiring materials having a low resistivity as the need of high definition is growing more. In such a case, in regard to the thin-film transistor drive liquid display device up to the definition of ultra extended graphics array (hereinafter, referred to as UXGA) (1600×1200), the thin-film transistor drive liquid display device without unevenness of color can be manufactured with a high manufacturing yield by using an aluminum group wiring material and setting the wires to an appropriate thickness (about 200 nm). However, in regard to the thin-film transistor drive liquid display device having a finer definition above quadrable extended graphics array (hereinafter, referred to as QXGA) (2048×1536), troubles such as unevenness of color or the like caused by the wiring resistance are occur when an aluminum group wiring material is used for the wiring material of the thin-film transistor drive liquid display device. In this case, if the thickness of the wiring is increased in order to reduce the wiring resistance, the coverage of the insulator film covering the wires is degraded and accordingly the manufacturing yield is decreased. In order to solve this problem, it is necessary to employ a metallic material having a resistivity lower than that of the aluminum group wiring material, for example, silver or an alloy containing silver as the major constituent.

Although the thin-film transistor drive liquid display device which uses silver for the low-resistive wiring material and has the clad structure of cladding the wiring with the other metallic material is known, as described above, it is required to perform two processes of photolithography in order to form the clad structure. As far as such a means is used, the manufacturing process becomes complicated, and the thin-film transistor drive liquid display devices cannot be manufactured in low cost, and accordingly low-cost thin-film transistor drive liquid display devices cannot be supplied to the market.

SUMMARY OF THE INVENTION

The present invention has been made from the viewpoint of the technical background described above, and an object of the present invention is to provide a wiring structure in which a laminated film composed of a film made of silver or an alloy containing silver as the major constituent and a film made of the other metallic material is formed, and a wiring pattern is formed through a single process of photolithography.

Another object of the present invention is to provide a liquid crystal display device which can be manufactured in low cost by forming the laminated film composed of a film made of silver or an alloy containing silver as the major constituent and a film made of the other metallic material and by forming a wiring pattern through a single process of photolithography.

In order to attain the object described above, the wiring structure in accordance with the present invention has a first structure which comprises a plurality of first parallel wires; a plurality of second parallel wires intersecting with the first parallel wires; and a plurality of active elements, each of the active elements being arranged at a position near an intersection of the first parallel wire and the second parallel wire and connected to the first parallel wire and the second parallel wire, wherein part or all of the first parallel wires and the second parallel wires are of a laminated structure of a layer made of silver or an alloy containing silver as a major constituent and a layer made of a metallic element having a standard electrode potential of dissolution reaction lower than the standard electrode potential of silver or an alloy containing said metallic element as a major constituent, and are formed through a single process of photolithography.

According to the first structure described above, since the metal capable of being etched together with silver or the alloy containing silver as the major constituent and having a standard electrode potential of dissolution reaction lower than that of silver, that is, the metal capable of being anodically polarized by electrochemical reaction during wet etching is selected as the metallic material laminated on a film made of silver or the alloy containing silver as the major constituent, the resistivity of wiring material can be decreased and the cross-sectional shape of the wire can be formed in a forward tapered shape through the electrochemical reaction. Thereby, it is possible to obtain a wiring structure of a liquid crystal display device in which the coverage of insulator film on the wiring can be secured.

Further, in order to attain the object described above, the wiring structure in accordance with the present invention has a second structure which comprises a plurality of first parallel wires; a plurality of second parallel wires intersecting with the first parallel wires; and a plurality of active elements, each of the active elements being arranged at a position near an intersection of the first parallel wire and the second parallel wire and connected to the first parallel wire and the second parallel wire, wherein part or all of the first parallel wires and the second parallel wires are of a three-layer laminated structure of a bottom layer made of a metallic element having a standard electrode potential of dissolution reaction lower than the standard electrode potential of silver or an alloy containing the metallic element as a major constituent, an intermediate layer made of silver or an alloy containing silver as a major constituent and a top layer made of a metallic element having a standard electrode potential of dissolution reaction lower than the standard electrode potential of silver or an alloy containing the metallic element as a major constituent, and the three-layer laminated structure is formed through a single process of photolithography.

According to the second structure described above, since the metal capable of being etched together with silver or the alloy containing silver as the major constituent and having standard electrode potential of dissolution reaction lower than that of silver, that is, the metal capable of being anodically polarized by electrochemical reaction during wet etching is selected as the metallic material laminated on a film made of silver or the alloy containing silver as the major constituent, the resistivity of wiring material can be decreased and the cross-sectional shape of the wire can be formed in a forward tapered shape through the electrochemical reaction, similarly to the first structure. Thereby, it is possible to obtain a wiring structure of a liquid crystal display device in which the coverage of insulator film on the wiring can be secured.

Further, in order to attain the other object described above, the liquid crystal display device in accordance with the present invention has a third structure which comprises a first substrate and a second substrate arranged opposite to each other; a plurality of parallel gate wires; a plurality of parallel data wires intersecting with the parallel gate wires; a plurality of thin-film transistors each arranged at a position near each of the intersections of the parallel gate wires and the parallel data wires, the thin-film transistor being connected to the corresponding parallel gate wire and the corresponding parallel data wire; and gate insulator films each covering the parallel gate wire, the parallel gate wires and the parallel data wires and the thin-film transistors and the gate insulator films being formed on one surface of the first substrate; and a liquid crystal layer put between the first substrate and the second substrate, wherein at least one of the parallel gate wiring and the parallel data wiring has the first or the second wiring structure.

According to the third structure described above, since the wiring structure of the first structure or the second structure is used in at least one of the parallel gate wiring and the parallel data wiring, at least one of the resistance of the parallel gate wiring and the resistance of the parallel data wiring can be reduced, and at the same time the cross-sectional shape of the wire can be formed in a forward tapered shape through the electrochemical reaction. Thereby, it is possible to secure the coverage of insulator film on the wiring, and to obtain the thin-film transistor liquid crystal display device with a high manufacturing yield.

Further, in order to attain the other object described above, the liquid crystal display device in accordance with the present invention has a fourth structure which comprises a first substrate and a second substrate arranged opposite to each other; a plurality of parallel gate wires; a plurality of parallel data wires intersecting with the parallel gate wires; a plurality of thin-film transistors each arranged at a position near each of the intersections of the parallel gate wires and the parallel data wires, the thin-film transistor being connected to the corresponding parallel gate wire and the corresponding parallel data wire; gate insulator films each covering the parallel gate wire; and transparent electrodes to be used as connecting terminals for at least one of the parallel gate wiring and the parallel data wiring, the parallel gate wires and the parallel data wires and the thin-film transistors and the gate insulator films and the transparent electrodes being formed on one surface of the first substrate; and a liquid crystal layer put between the first substrate and the second substrate, wherein at least one of the parallel gate wiring and the parallel data wiring has the first or the second wiring structure, and the transparent electrode is made of a material selected from the group consisting of a mixed oxide of indium oxide and zinc oxide, and a mixed oxide of indium oxide and germanium oxide.

According to the fourth structure described above, the wiring structure of the first structure or the second structure is used in at least one of the parallel gate wiring and the parallel data wiring, and the transparent electrode is made of a material selected from the group consisting of a mixed oxide of indium oxide and zinc oxide, and a mixed oxide of indium oxide and germanium oxide. Therefore, at least one of the resistance of the parallel gate wiring and the resistance of the parallel data wiring can be reduced, and at the same time the cross-sectional shape of the wire can be formed in a forward tapered shape through the electrochemical reaction, and the transparent electrode can be formed without corroding silver or the alloy containing silver as the major constituent. Thereby, it is possible to secure the coverage of insulator film on the wiring, and to obtain the thin-film transistor liquid crystal display device with a high manufacturing yield.

In the first structure to the fourth structure described above, molybdenum (Mo) is the most suitable metal for the metallic capable of being etched together with silver and the alloy containing silver as the major constituent and having a standard electrode potential of dissolution reaction lower than the standard electrode potential of silver.

DESCRIPTION OF THE PREFERRED EMBODIMENTS

Embodiments will be described below, referring to the accompanied drawings.

Figure 1:
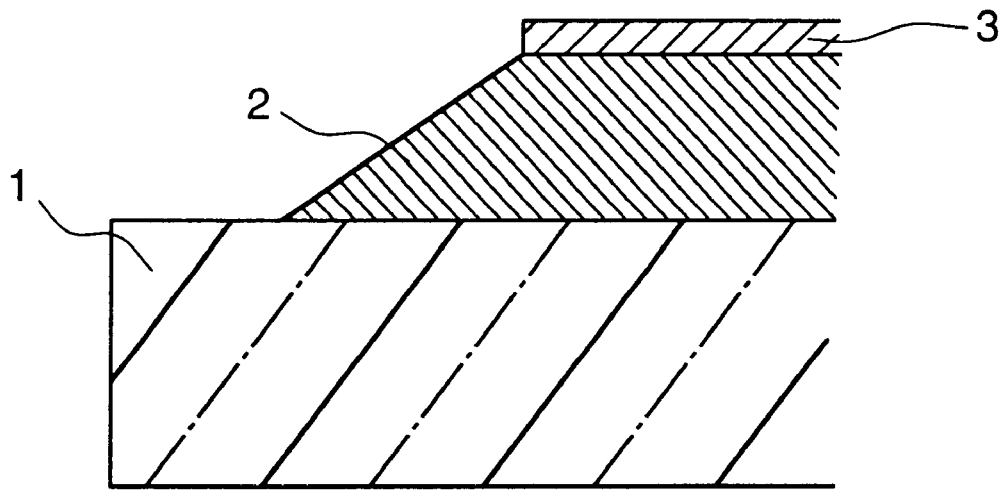
FIG. 1 shows a first embodiment of a wiring structure of a liquid crystal display device in accordance with the present invention, and is a cross-sectional view showing the structure of an edge portion of the wiring structure.

FIG. 1 shows a first embodiment of a wiring structure of a liquid crystal display device in accordance with the present invention, and is a cross-sectional view showing the structure of an edge portion of the wiring structure.

As shown in FIG. 1, the wiring structure according to the first embodiment is composed of a glass substrate 1, a film 2 made of an alloy (a first alloy) containing silver (Ag) as the major constituent and a film 3 made of an alloy (a second alloy) containing molybdenum (Mo) as the major constituent. The film 2 made of the alloy (the first alloy) containing silver (Ag) as the major constituent and the film 3 made of the alloy (the second alloy) containing molybdenum (Mo) as the major constituent are laminated on the glass substrate 1 to form wiring of a laminated structure.

The wiring structure having the structure described above can be obtained through the following fabricating process. Initially, the film 2 made of the alloy (the first alloy) containing silver (Ag) as the major constituent and the film 3 made of the alloy (the second alloy) containing molybdenum (Mo) as the major constituent are continuously formed on the glass substrate 1. Therein, molybdenum (Mo) used for the second alloy film 3 is a metal having a standard electrode potential of dissolution reaction lower than that of silver (Ag) used for the first alloy film 2 and accordingly a metallic material capable of being etched together with silver (Ag).

Next, a resist pattern is formed to the formed films through photolithography, and the formed films are etched together using the resist pattern to form wiring of the laminated structure. Therein, a mixed solution of phosphoric acid and nitric acid having a phosphoric acid concentration of 35 weight % is used for the etchant (etching solution) at etching. The mixed solution is substantially different in the composition of a mixed solution of phosphoric acid and nitric acid having a phosphoric acid concentration of around 65 weight % which is generally used as an aluminum etching solution.

By fabricating the wiring structure using the batch etching processing as described above, the films were etched so as to make the cross-sectional shape of the wire of the lamiated structure in a shape that the edge portion of the film 2 made of the alloy (the first alloy) containing silver (Ag) as the major constituent became a forward tapered shape between the glass substrate 1 and the film 3 made of the alloy (the second alloy) containing molybdenum (Mo) as the major constituent, as shown in FIG. 1. When the wiring structure described above was covered with a silicon nitride (SiN) film through chemical vapor deposition, sufficient coverage could be obtained.

Figures 5, 6:
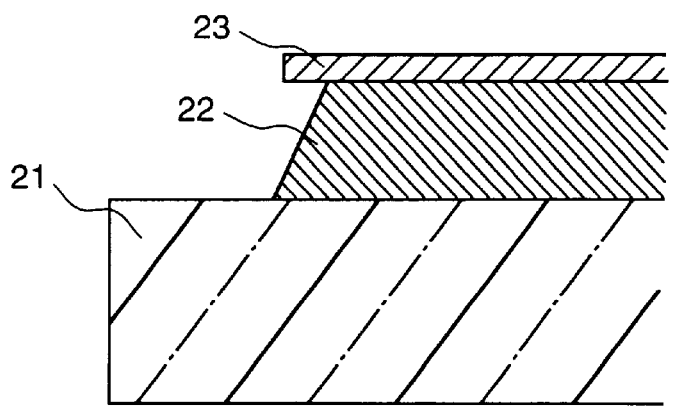
FIG. 5 is a table showing the characteristics of contact between a source wire and a pixel electrode when composition of an alloy containing molybdenum as the major constituent is varied, the alloy being used for the uppermost layer of the source wiring of the laminated structure in the first embodiment of the liquid crystal display device.
FIG. 6 shows a comparative wiring structure which is fabricated in order to compare with the wiring structure of the first embodiment, and is a cross-sectional view showing the structure of the edge portion.

FIG. 6 shows a comparative wiring structure which is fabricated in order to compare with the wiring structure of the first embodiment, and is a cross-sectional view showing the structure of the edge portion.

In the comparative wiring structure, an alloy (a first alloy) 22 containing aluminum (Al) as the major constituent is used instead of using the alloy (the first alloy) 2 containing silver (Ag) as the major constituent in the first embodiment of the wiring structure.

As shown in FIG. 6, the comparative wiring structure is composed of a glass substrate 21, a film 22 made of the alloy (the first alloy) containing aluminum (Al) as the major constituent and a film 23 made of the alloy (the second alloy) containing molybdenum (Mo) as the major constituent. The film 22 made of the alloy (the first alloy) containing aluminum (Al) as the major constituent and the film 23 made of the alloy (the second alloy) containing molybdenum (Mo) as the major constituent are laminated on the glass substrate 21 to form wiring of a laminated structure.

The wiring structure having the structure described above can be obtained through the following fabricating process. Initially, the film 22 made of the alloy (the first alloy) containing aluminum (Al) as the major constituent and the film 23 made of the alloy (the second alloy) containing molybdenum (Mo) as the major constituent are continuously formed on the glass substrate 21. Therein, molybdenum (Mo) used for the second alloy film 23 is a metal having a standard electrode potential of dissolution reaction higher than that of aluminum (Al) used for the first alloy film 22 and accordingly the relationship between the standard electrode potentials of the first alloy 22 and the second alloy 23 are inverse to those in the first embodiment of the wiring structure.

Similarly, a resist pattern is formed to the formed films through photolithography, and the formed films are etched together using the resist pattern to form wiring of the laminated structure. Therein, the normal aluminum etching solution, which is the mixed solution composed of phosphoric acid and nitric acid having a phosphoric acid concentration of 65 weight %, is used for the etchant (etching solution) at etching.

By fabricating the comparative wiring structure using the batch etching processing as described above, the films were etched so as to make the cross-sectional shape of the wire of the laminated structure in a shape that the edge portion of the film 22 made of the alloy (the first alloy) containing aluminum (Al) as the major constituent became a visor-like projecting shape to the film 23 made of the alloy (the second alloy) containing molybdenum (Mo) as the major constituent, as shown in FIG. 6. The reason is that the film 23 made of the alloy (the second alloy) containing molybdenum (Mo) as the major constituent is cathodic-polarized when the films are etched together because the standard electrode potential of dissolution reaction of molybdenum (Mo) is higher than the standard electrode potential of aluminum (Al), and as the result the etching rate of the film 23 made of the alloy (the second alloy) containing molybdenum (Mo) as the major constituent is decreased. That is, in the comparative wiring structure described above, it was difficult to make the wiring structure having the forward-tapered shape as shown in FIG. 1 without sufficiently selecting the etching condition with care, and insufficient coverage was obtained when the comparative wiring structure described above was covered with a silicon nitride (SiN) film through chemical vapor deposition.

Figure 2:
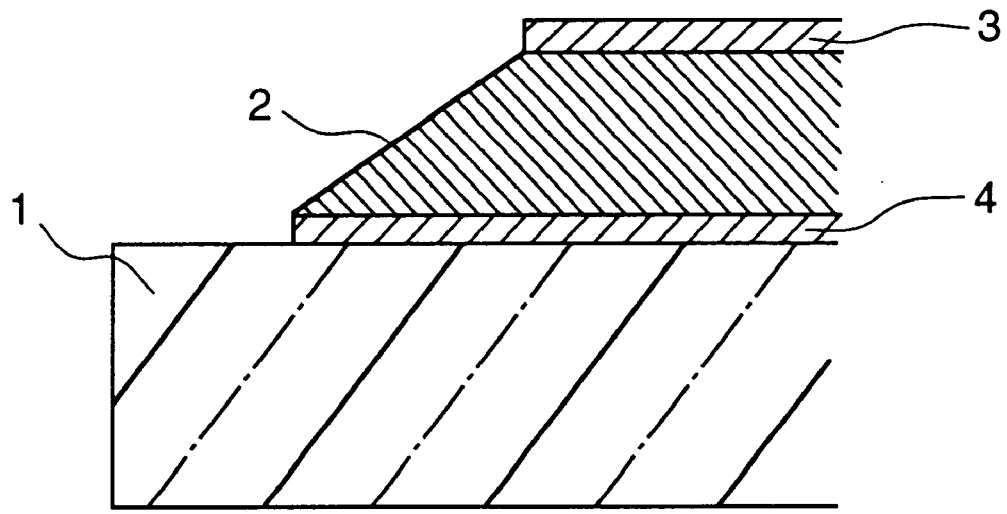
FIG. 2 shows a second embodiment of a wiring structure of a liquid crystal display device in accordance with the present invention, and is a cross-sectional view showing the structure of an edge portion of the wiring structure.

FIG. 2 shows a second embodiment of a wiring structure of a liquid crystal display device in accordance with the present invention, and is a cross-sectional view showing the structure of an edge of the wiring structure which is a three-layer structure.

Comparing to the first embodiment of the wiring structure, in this wiring structure, a film 4 made of the alloy (a third alloy) containing molybdenum (Mo) as the major constituent is formed between the glass substrate 1 and the film 2 made of the alloy (the first alloy) containing silver (Ag) as the major constituent, as shown in FIG. 2. Thereby, the three-layer structure is formed by the lowermost film 4 made of the alloy (the third alloy) containing molybdenum (Mo) as the major constituent, the intermediate film 2 made of the alloy (the first alloy) containing silver (Ag) as the major constituent and the uppermost film 3 made of the alloy (the second alloy) containing molybdenum (Mo) as the major constituent.

The wiring structure having the structure described above can be obtained through the following fabricating process. Initially, the film 4 made of the alloy (the third alloy) containing molybdenum (Mo) as the major constituent, and next the film 2 made of the alloy (the first alloy) containing silver (Ag) as the major constituent, and then the film 3 made of the alloy (the second alloy) containing molybdenum (Mo) as the major constituent are continuously formed on the glass substrate 1.

Next, a resist pattern is formed to the formed films through photolithography, and the formed films are etched together using the resist pattern to form wiring of the three-layer structure. Therein, a mixed solution of phosphoric acid and nitric acid having a phosphoric acid concentration of 35 weight % is used for the etchant (etching solution) at etching.

By fabricating the wiring structure using the batch etching processing as described above, the films were etched so as to make the cross-sectional shape of the wire of the three-layer clad structure in a shape that the edge portion of the film 2 made of the alloy (the first alloy) containing silver (Ag) as the major constituent became a forward tapered shape between the film 4 made of the alloy (the third alloy) containing molybdenum (Mo) as the major constituent and the film 3 made of the alloy (the second alloy) containing molybdenum (Mo) as the major constituent, as shown in FIG. 2. When the wiring structure described above was covered with a silicon nitride (SiN) film through chemical vapor deposition, sufficient coverage could be also obtained.

In the first embodiment and the second embodiment described above, the descriptions have been made on the examples in which the alloy (the first alloy) 2 containing silver (Ag) as the major constituent is used for the metallic material forming the film 2. However, the metallic material forming the film 2 in the present invention is not limited to the alloy containing silver (Ag) as the major constituent, but the similar function can be obtained by using silver (Ag) itself instead of the alloy containing silver (Ag) as the major constituent.

Further, in the first embodiment and the second embodiment described above, the descriptions have been made on the examples in which the alloy (the second alloy) 3 containing molybdenum (Mo) as the major constituent or the alloy (the third alloy) 4 containing molybdenum (Mo) as the major constituent is used for the film 3 or the film 4. However, the metallic material forming the film 3 or the film 4 in the present invention is not limited to the alloy containing molybdenum (Mo) as the major constituent, but the similar function can be obtained by using molybdenum (Mo) itself instead of the alloy containing molybdenum (Mo) as the major constituent.

Furthermore, although there are metals having standard electrode potential of dissolution reaction lower than that of silver (Ag) such as chromium (Cr), titanium (Ti), tungsten (W), zirconium (Zr), hafnium (Hf), tantalum (Ta), niobium (Nb) and so on in addition to molybdenum, it is found from study conducted by the inventors of the present invention that the best metal for coupling with silver (Ag) or the alloy containing silver (Ag) as the major constituent is molybdenum (Mo) or the alloy containing molybdenum (Mo) as the major constituent which can be etched together with silver (Ag) or the alloy containing silver (Ag) as the major constituent, and can use a mixed solution of phosphoric acid and nitric acid having a phosphoric acid concentration of 35 weight % as the etchant (etching solution) at etching, and can be dissolved at an etching rate nearly equivalent to the etching rate of silver (Ag) or the alloy containing silver (Ag) as the major constituent using the etching solution.

Therefore, the wiring structure of the liquid crystal display device in accordance with the present invention is the wiring of the two-layer or the three-layer structure which is formed by laminating the film 3 made of molybdenum (Mo) or the alloy (the second alloy) containing molybdenum (Mo) as the major constituent and the film 4 made of molybdenum (Mo) or the alloy (the third alloy) containing molybdenum (Mo) as the major constituent to the film 2 made of silver (Ag) or the alloy (the first alloy) containing silver (Ag) as the major constituent.

Figure 3:
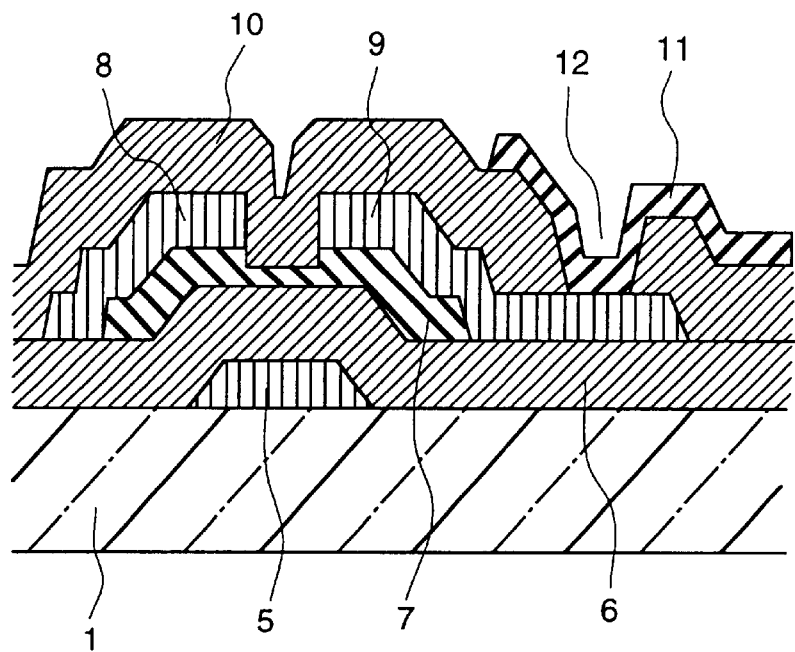
FIG. 3 shows the first embodiment of the wiring structure of the liquid crystal display device in accordance with the present invention, and is a cross-sectional view showing the structure of a portion of the thin-film transistor.

Next, FIG. 3 shows the first embodiment of the wiring structure of the liquid crystal display device in accordance with the present invention, and is a cross-sectional view showing the structure of a portion of the thin-film transistor.

In FIG. 3, the reference character 5 is a gate wire, the reference character 6 is a gate insulator film, the reference character 7 is a semiconductor layer, the reference character 8 is a drain wire, the reference character 9 is a source wire, the reference character 10 is a protective film, the reference character 11 is a pixel electrode and the reference character 12 is a contact hole, and the other component elements similar to the component elements shown in FIG. 1 are identified by the same reference characters.

The gate wire 5 is formed on the surface of the glass substrate 1, and the gate insulator film 6 is formed on the surface of the glass substrate 1 including on the gate wire 5. The semiconductor layer 7 is formed on the gate insulator film 6 corresponding to the gate wire 5, and the drain wire 8 is arranged in the side of and connected to one end of the semiconductor layer 7, and the source wire 9 is arranged in the side of and connected to the other end. The protective film 10 is formed on the semiconductor layer 7, the drain wire 8 and the source wire 9. The contact hole 12 is formed in the protective film 10 on the source wire 9, and the pixel electrode 11 is formed on the protective film 10 including the inside of the contact hole 12.

The liquid crystal display device having the structure described above can be obtained through the following manufacturing process. Initially, the film made of the alloy (the third alloy) containing molybdenum (Mo) as the major constituent, the film made of the alloy (the first alloy) containing silver (Ag) as the major constituent, and the film made of the alloy (the second alloy) containing molybdenum (Mo) as the major constituent are successively formed on the glass substrate 1 through the sputtering method. Next, a resist pattern is formed to the formed films through photolithography, and the gate wiring 5 is formed by etching the formed films using the resist pattern through wet etching using the etchant (etching solution) of the mixed solution of phosphoric acid and nitric acid having a phosphoric acid concentration of 35 weight %.

Next, the gate insulator film 6 of silicon nitride (SiN) film, and the semiconductor layer 7 composed of amorphous silicon layers (an intrinsic semiconductor layer and an n-type semiconductor layer) are successively formed through the plasma chemical vapor deposition method. After that, a resist pattern is formed to the formed films through photolithography, and the semiconductor layer 7 is patterned using the formed resist pattern through the dry etching.

Then, the film made of the alloy (the third alloy) containing molybdenum (Mo) as the major constituent, the film made of the alloy (the first alloy) containing silver (Ag) as the major constituent and the film made of the alloy (the second alloy) containing molybdenum (Mo) as the major constituent are successively formed through the sputtering method. Next, a resist pattern is formed to the formed films through photolithography, and the drain wire 8 and source wire 9 are formed by etching the formed films using the resist pattern through wet etching using the etchant (etching solution) of the mixed solution of phosphoric acid and nitric acid having a phosphoric acid concentration of 35 weight %. After that, the n-type semiconductor layer 7 between the drain wire 8 and the source wire 9 is etched through the dry etching method.

Next, the protective film 10 is formed by forming a silicon nitride (SiN) film through the plasma chemical vapor deposition method. Then, a resist pattern is formed to the formed film through photolithography, and the contact hole 12 is formed by etching the formed film using the resist pattern through etching using hydrogen fluoride acid. After that, an indium zinc oxide (IZO) film is formed through the sputtering method. Then, a resist pattern is formed to the formed film through photolithography, and the transparent pixel electrode 11 is formed by etching the formed film using the resist pattern through wet etching using oxalic acid.

In that case, although indium tin oxide (ITO) may be employed as the material for forming the pixel electrode 11, there is a possibility that hydrogen bromide acid of the etching solution for the indium tin oxide (ITO) film may corrode silver (Ag) or the alloy containing silver (Ag) as the major constituent used for the drain wire 8 and the source wire 9 by the reaction that $Ag+Br^- \rightarrow AgBr+e^-$. Therefore, it is preferable to use a material capable of being etched by a weak acid such as indium zinc oxide (IZO) or indium germanium oxide (IGO).

The liquid crystal display device obtained through the manufacturing process described above can form a QXGA active matrix by thin-film transistors of inverse stagger type, and the liquid crystal display device using the active matrix can display an image without unevenness of color.

On the other hand, each of the gate wire 5, the drain wire 8 and the source wire was formed in a wire of the three-layer structure using an alloy containing aluminum (Al) as the major constituent and an alloy containing molybdenum (Mo) as the major constituent to form an QXGA active matrix. However, the liquid crystal display device using the active matrix could not display an image without unevenness of color.

In the first embodiment of the liquid crystal display device, the contact hole 12 is formed through the manufacturing process of etching the protective film 10 made of silicon nitride (SiN) using hydrogen fluoride acid. However, the contact hole 12 may be formed through a manufacturing process of dry etching using sulfur hexafluoride ($SF_6$) gas instead of hydrogen fluoride acid.

The above manufacturing process will be described below. Initially, the film made of the alloy (the third alloy) containing chromium (Cr) of 0.5 weight % in molybdenum (Mo), the film made of the alloy (the first alloy) containing silver (Ag) as the major constituent, and the film made of the alloy (the second alloy) containing chromium of 0.5 weight % in molybdenum (Mo) are successively formed on the glass substrate 1 through the sputtering method. Next, a resist pattern is formed to the formed films through photolithography, and the gate wiring 5 is formed by etching the formed films through wet etching using the mixed solution of phosphoric acid and nitric acid having a phosphoric acid concentration of 35 weight %.

Next, the gate insulator film 6 of silicon nitride (SiN) film, and the semiconductor layer 7 composed of amorphous silicon layers (an intrinsic semiconductor layer and an n-type semiconductor layer) are successively formed through the plasma chemical vapor deposition method. After that, a resist pattern is formed to the formed films through photolithography, and the semiconductor layer 7 is patterned using the formed resist pattern through the dry etching.

Then, the film made of the alloy (the third alloy) containing molybdenum (Mo) as the major constituent, the film made of the alloy (the first alloy) containing silver (Ag) as the major constituent and the film made of the alloy (the second alloy) containing molybdenum (Mo) as the major constituent are successively formed through the sputtering method. Next, a resist pattern is formed to the formed films through photolithography, and the drain wire 8 and source wire 9 are formed by etching the formed films using the resist pattern through wet etching using the etchant (etching solution) of the mixed solution of phosphoric acid and nitric acid having a phosphoric acid concentration of 35 weight %. After that, the n-type semiconductor layer 7 between the drain wire 8 and the source wire 9 is etched through the dry etching method.

Next, the protective film 10 is formed by forming a silicon nitride (SiN) film through the plasma chemical vapor deposition method. Then, a resist pattern is formed to the formed film through photolithography, and the contact hole 12 is formed by etching the formed film using the resist pattern through dry etching using sulfur hexafluoride (SF$_6$) gas. After that, an indium zinc oxide (IZO) film is formed through the sputtering method. Then, a resist pattern is formed to the formed film through photolithography, and the transparent pixel electrode 11 is formed by etching the formed film using the resist pattern through wet etching using oxalic acid.

According to the manufacturing process described above, the contact between the source wire 9 and the pixel electrode 11 was good.

Figure 4:
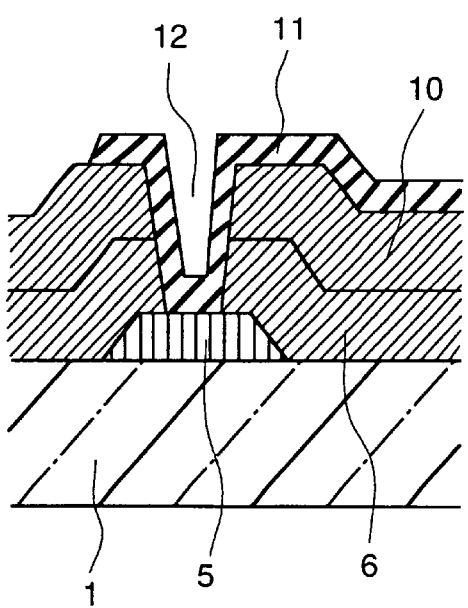
FIG. 4 shows a second embodiment of a liquid crystal display device using the wiring structure in accordance with the present invention, and is a cross-sectional view showing the structure of a portion of a gate terminal.

FIG. 4 shows a second embodiment of a liquid crystal display device using the wiring structure in accordance with the present invention, and is a cross-sectional view showing the structure of a portion of a gate terminal.

In FIG. 4, component elements similar to the component elements shown in FIG. 3 are identified by the same reference characters.

The gate wire 5 is formed on the surface of the glass substrate 1, and the gate insulator film 6 is formed on the surface of the glass substrate 1 including on the gate wire 5. The protective film 10 is formed on the gate insulator film 6, and the contact hole 12 is formed in the gate insulator film 6 and the protective film 10 on the gate wire 5. The pixel electrode 11 is formed on the protective film 10 including the inside of the contact hole 12.

The manufacturing process of the liquid crystal display device according to the structure described above is basically almost similar to the manufacturing process of the liquid crystal display device according to the first embodiment, and the contact hole 12 is formed in the gate insulator film 6 and the protective film 10 also through etching using hydrogen fluoride acid or through dry etching using sulfur hexafluoride (SF$_6$) gas described above. Therefore, explanation of the manufacturing process of the liquid crystal display device according to the second embodiment will be omitted here.

In the first and the second embodiments of the liquid crystal display devices described above, the description has been made on the examples in which the gate wire 5, the drain wire 8 and the source wire 9 are formed in the three-layer clad structure. However, these wires 5, 8, 9 in the present invention are not limited to the wires of three-layer structure, but the present invention may be applied to wiring of a two-layer structure composed of the alloy (the first alloy) containing silver (Ag) as the major constituent and the alloy (the second alloy) containing molybdenum as the major constituent, or to wiring in which only one or two wires among the wires 5, 8, 9 are of laminated structure.

FIG. 5 is a table showing the characteristics of contact between the source wire 9 and the pixel electrode 11 when the composition of the alloy containing molybdenum (Mo) as the major constituent is varied, the alloy being used for the uppermost layer of the source wire 9 of the laminated structure in the first embodiment of the liquid crystal display device shown in FIG. 3.

As shown in FIG. 5, in regard to the composition of the alloy (the second alloy) containing molybdenum (Mo) as the major constituent used for the uppermost layer of the source wire 9, in the case of the alloys containing molybdenum (Mo) as the major constituent and a small amount of chromium (Cr), defects in the contact characteristic occurred in an alloy having a chromium (Cr) content of 0.2 weight %. In the case of the alloys containing molybdenum (Mo) as the major constituent and a small amount of hafnium (Hf), defects in the contact characteristic occurred in an alloy having hafnium (Hf) content of 2.0 weight %. In the case of the alloys containing molybdenum (Mo) as the major constituent and a small amount of zirconium (Zr), defects in the contact characteristic occurred in an alloy having zirconium (Zr) content of 1.0 weight %. On the other hand, all of the alloys having a chromium (Cr) content within the range of 0.5 to 3.3 weight %, the alloys having a hafnium (Hf) content within the range of 5.0 to 30 weight % and the alloys having a zirconium (Zr) content within the range of 2.5 to 20 weight % were good in the contact characteristic.

As the results of investigation the alloys containing molybdenum (Mo) as the major constituent and having a small content of an additive of chromium (Cr), hafnium (Hf) or zirconium (Zr), it was found that in the contact portion, the alloy containing molybdenum (Mo) as the major constituent disappeared, and the alloy (the first alloy) containing silver (Ag) as the major constituent were directly in contact with the pixel electrode 11. The reason why the alloy containing molybdenum (Mo) as the major constituent disappears is that the alloy containing molybdenum (Mo) as the major constituent and having a small content of an additive of chromium (Cr), hafnium (Hf) or zirconium (Zr) is also etched by the etching when the contact hole 12 is formed in the protective film 10. On the contrary, the alloy containing molybdenum (Mo) as the major constituent and having a large content of an additive of chromium (Cr), hafnium (Hf) or zirconium (Zr) has resistance against dry-etching, and accordingly the contact hole 12 can be formed without disappearing of the alloy containing molybdenum (Mo) as the major constituent during dry etching. Therefore, the contact characteristic between the source electrode and the pixel electrode 11 is good.

As having been described above, according to the wiring structure of the liquid crystal display device in accordance with the present invention, the metal which is capable of being etched together with the film made of silver (Ag) or the alloy containing silver (Ag) as the major constituent, and at the same time which has a standard electrode potential of dissolution reaction lower than that of silver, that is, is anodically polarized by electrochemical reaction during wet etching is selected as the metallic material to be laminated to the film made of silver (Ag) or the alloy containing silver (Ag) as the major constituent, that is, molybdenum (Mo) is preferably selected, and the cross-sectional shape of wiring can be formed in a forward tapered shape by electrochemical reaction. Therefore, there is the effect of obtaining the wiring structure of the liquid crystal display device which can reduce the resistivity of wiring material, and which can secure the coverage of the insulator film on the wiring can be obtained.

Further, according to the liquid crystal display device in accordance with the present invention, the wiring structure of the first structure or the second structure is used in at least one of the parallel gate wiring and the parallel data wiring, and the cross-sectional shape of wiring is formed in a forward tapered shape by electrochemical reaction. Therefore, there is the effect of obtaining the thin-film transistor drive liquid crystal display device which can reduce the resistance of at least one of the parallel gate wiring and the parallel data wiring, and which can secure the coverage of the insulator film on the wiring and can attain high manufacturing yield.

What is claimed is:

1. A wiring structure of a liquid crystal display device comprising:
   a plurality of first parallel wires;
   a plurality of second parallel wires intersecting with said first parallel wires; and a plurality of active elements, each of said active elements being arranged at a position near an intersection of said first parallel wire and said second parallel wire and connected to said first parallel wire and said second parallel wire, wherein part or all of said first parallel wires and said second parallel wires are of a laminated structure of a layer made of silver or an alloy containing silver as a major constituent and a layer made of a metallic element having a standard electrode potential of dissolution reaction lower than the standard electrode potential of silver or an alloy containing said metallic element as a major constituent, and are formed through a single process of photolithography, and wherein said alloy containing molybdenum as a major constituent is an alloy containing zirconium not less than 2.5 weight % or hafnium not less than 5.0 weight %.

2. A wiring structure of a liquid crystal display device comprising:

a plurality of first parallel wires;

a plurality of second parallel wires intersecting with said first parallel wires; and a plurality of active elements, each of said active elements being arranged at a position near an intersection of said first parallel wire and said second parallel wire and connected to said first parallel wire and said second parallel wire, wherein part or all of said first parallel wires and said second parallel wires are of a three-layer laminated structure of a bottom layer made of an alloy containing, as a major constituent, a metallic element having a standard electrode potential of dissolution reaction lower than the standard electrode potential of silver, an intermediate layer made of silver or an alloy containing silver as a major constituent and a top layer made of an alloy containing, as a major constituent, a metallic element having a standard electrode potential of dissolution reaction lower than the standard electrode potential of silver, and said three-layer laminated structure is formed through a single process of photolithography, and wherein said alloy containing molybdenum as a major constituent is an alloy containing zirconium of not less than 2.5 weight % or hafnium of not less than 5.0 weight %.

3. A liquid crystal display device comprising:

a first substrate and a second substrate arranged opposite to each other;

plurality of parallel gate wires;

a plurality of parallel data wires intersecting with said parallel gate wires;

a plurality of thin-film transistors each arranged at a position near each of the intersections of said parallel gate wires and said parallel data wires, said thin-film transistor being connected to the corresponding parallel gate wire and the corresponding parallel data wire; and gate insulator films each covering said parallel gate wire, said parallel gate wires and said parallel data wires and said thin-film transistors and said gate insulator films being formed on one surface of said first substrate; and a liquid crystal layer put between said first substrate and said second substrate, wherein at least one of said parallel gate wiring and said parallel data wiring has the wiring structure according to claim 1 or claim 2.

4. A liquid crystal display device comprising:

a first substrate and a second substrate arranged opposite to each other;

a plurality of parallel gate wires;

a plurality of parallel data wires intersecting with said parallel gate wires;

a plurality of thin-film transistors each arranged at a position near each of the intersections of said parallel gate wires and said parallel data wires, said thin-film transistor being connected to the corresponding parallel gate wire and the corresponding parallel data wire;

gate insulator films each covering said parallel gate wire; and transparent electrodes to be used as connecting terminals for at least one of said parallel gate wiring and said parallel data wiring, said parallel gate wires and said parallel data wires and said thin-film transistors and said gate insulator films and said transparent electrodes being formed on one surface of said first substrate; and a liquid crystal layer put between said first substrate and said second substrate, wherein at least one of said parallel gate wiring and said parallel data wiring has the wiring structure according to claim 1 or claim 2, and said transparent electrode is made of a material selected from the group consisting of a mixed oxide of indium oxide and zinc oxide, and a mixed oxide of indium oxide and germanium oxide.

* * * * *